April 26, 1960
A. F. GILLIARD ET AL
2,934,082
FLOAT-OPERATED BUTTERFLY VALVE
Filed Feb. 13, 1958
2 Sheets-Sheet 2
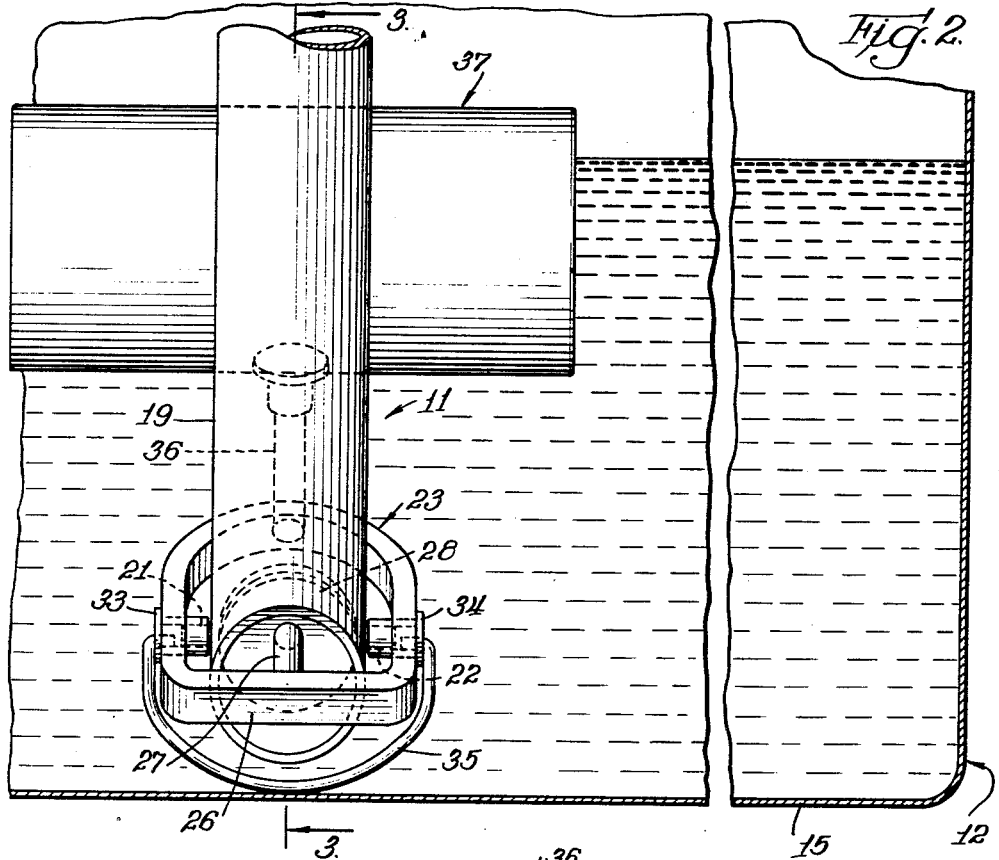
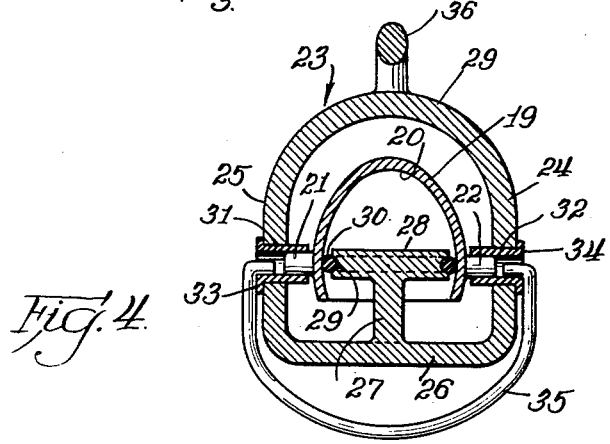
Inventors
Allen F. Gilliard and
Chester W. Held
By E. Manning Giles
Atty.

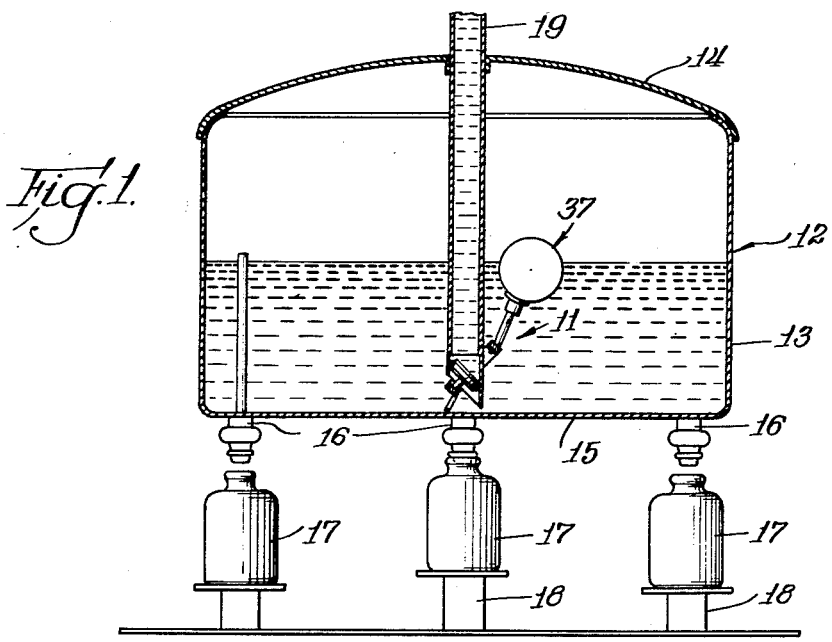
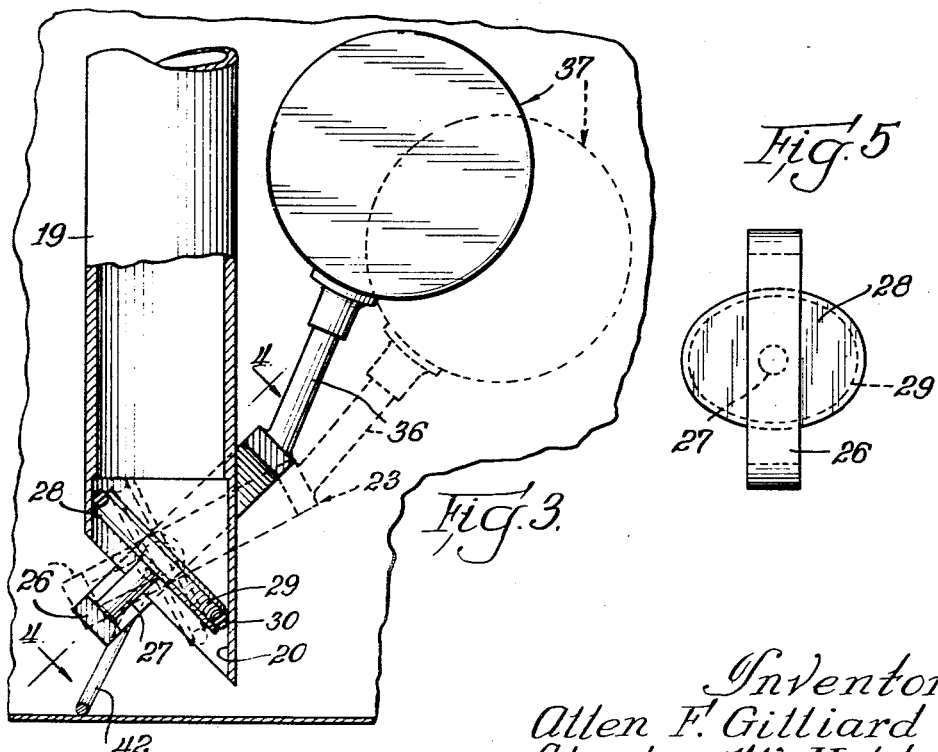
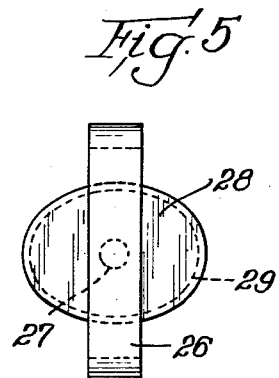

United States Patent Office 2,934,082
Patented Apr. 26, 1960

2,934,082

FLOAT-OPERATED BUTTERFLY VALVE

Allen F. Gilliard, Grosse Pointe Woods, Mich., and Chester W. Held, Milwaukee, Wis., assignors to Cherry-Burrell Corporation, Chicago, Ill., a corporation of Delaware Application February 13, 1958, Serial No. 715,054

4 Claims. (Cl. 137—315)

Our invention relates to a float-operated butterfly valve and has reference more particularly to a valve of this type adapted to admit a liquid product such as milk into the liquid reservoir of a bottle filler or the like.

Bottle fillers of the overhead reservoir type such as are employed in the dairy industry depend upon gravity to maintain flow of milk or other liquid to the receptacles to be filled. In some equipment of this type, pressure differentials are maintained to assist or accelerate gravity flow, but in virtually all such equipment it is important to maintain the liquid level in the reservoir at a predetermined level. The function of the float-operated valve is to maintain that desired liquid level within reasonable limits by starting, stopping, and throttling the flow of liquid through a supply duct as variations occur in the liquid level. During operation, the filler reservoir has a substantially steady outflow of liquid into the receptacles being filled and the float valve tends to accommodate itself to the liquid outflow by opening sufficiently to admit a corresponding inflow of liquid to the reservoir.

Float-operated valves of this type are partially immersed in the liquid in the reservoir, and hence must be scrupulously clean to avoid contamination. This requires utmost cleanability and it is therefore necessary that such valves be constructed to facilitate convenient disassembly, cleaning, and reassembly and to withstand the wear entailed in frequent dismantlings. Moreover, such valves should be designed to subject the milk flowing therethrough to a minimum of agitation so as to avoid formation of foam and incorporation of air in the milk.

The principal object of our invention is to provide a float valve which maintains a substantially constant level of milk in a milk supply tank.

Another object of the invention is to provide a float valve which is simple in construction, that may be taken apart, cleaned and reassembled in a short period of time and the parts will withstand the abuse and wear of frequent assembly and disassembly.

A further object of the instant invention is to provide a float valve through which milk may be introduced into a milk supply tank near the bottom thereof and distributed around said valve to minimize the agitation of the milk as it enters the supply tank.

A still further object of the invention is to provide a float valve which operates easily under high pressures.

Other objects, uses and advantages will be obvious or become apparent from a consideration of the following description and the accompanying drawings in which:

Fig. 1 is a side view partially in section, showing a liquid reservoir with the float-operated valve of our invention in said reservoir;

Fig. 2 is an enlarged side view of the valve shown in Fig. 1;

Fig. 3 is a sectional view on the line 3—3 of Fig. 2;

Fig. 4 is a sectional view on the line 4—4 of Fig. 3; and

Fig. 5 is a plan view of the yoke and disc portion of the valve.

Referring now to the drawings, a float-operated valve, generally indicated by numeral 11, is used in the milk reservoir or supply tank 13 of a milk bottle filler 12. The filler 12 is of the gravity feed type, although it is understood that the float valve 11 may be applicable to other types of fillers, as well.

The supply tank 13 has a somewhat upwardly crowned cover 14 which rests on the tank 13. The supply tank 13 is provided annularly around the bottom 15 with spaced filler valves 16 through which milk is introduced into receptacles such as milk bottles 17 as the latter are raised by individual supports 18 into operating engagement with filler valves 16. The milk is supplied to the supply tank 13 through a duct 19 which serves to provide a constant supply of milk.

The float valve 11, as may be seen in Figs. 2 and 3, consists of an oblique valve seat 20 at the lower end of duct 19. The valve seat 20 defines a flow aperture through which the milk in duct 19 may flow into supply tank 13. The duct 19 is provided at diametrically opposite sides with external bosses 21 and 22 adjacent the flow aperture defined by the valve seat 20.

A yoke 23 shown most clearly in Figs. 2 and 4 has a pair of legs 24 and 25 the ends of which are joined by relatively straight cross member 26; a stem 27 projects into portion of the yoke 23 straddled by the legs 24 and 25 from the center of the cross member 26 and is provided at the end opposite the cross member 26 with an elliptical disc 28 which corresponds in configuration to the inside dimensions of the seat 20. The stem 27 engages the disc 28 at its center as shown in Fig. 5 so that it may be disposed in the seat 20 at an oblique angle with respect to the duct 19. Around its periphery the disc 28 is provided with a groove 29 in which an O-ring 30 of rubber, neoprene, or other compressible material is disposed for sealing engagement with the seat 20 when the disc 28 is in closed position as shown by the solid lines in Fig. 3. The disc 28 is shown in partially open position by the dotted lines in Fig. 3.

The respective legs 24 and 25 are provided with bushings 31 and 32 which are aligned axially with the short diameter of the disc 28. The respective bushings 31 and 32 engage the bosses 21 and 22 so that the yoke 23 pivots thereon. The bushings 31 and 32 are provided with flanges 33 and 34 which limit their insertion into the holes in the legs 24 and 25 and said bushings 31 and 32 are held in place by means of a U-clip 35 with inturned ends which engage in the bushings 31 and 32 as shown in Figs. 2 and 4.

A float rod 36 projects from the yoke 23 to a somewhat cylindrical shaped float 37, the float 37 being a sealed container of such dimension and weight as to be buoyant in the liquid such as mlik to be contained in the tank 13.

In operation milk is introduced into the duct 19 from a storage tank or other source. The tank 13 being empty, the float 37 is at rest in its lowest position (not shown) with the butterfly disc 28 in open position. As milk flows into the tank 13 and reaches the level of the float 37, the float 37 rises gradually with the liquid level passing through the position shown by the dotted lines in Fig. 3 to the position shown by the solid lines in Fig. 3 in which the disc 28 is in closed position, thus sealing off the flow of milk or other liquid through the duct 19.

When the bottle filling operation is completed and milk has been drained out of the tank 13 through the filling valves 16, the valve assembly may be disassembled for cleaning in the following manner: the U-clip 35 is sprung outwardly to disengage the bushings 31 and 32; the bushings 31 and 32 are then removed from the holes in the legs 24 and 25; this disengages the yoke 23 from the bosses 21 and 22 and permits removal of the float-yoke-disc assembly from the duct 19. The O-ring 30 may then be removed from the disc 28 and each component part may be thoroughly cleaned before reassembly.

If desired the assembly may be so constructed as to permit removal of the float 37 from the float rod 36. The parts are preferably made of stainless steel because of its suitability for contact with comestibles such as milk.

While we have shown and described our invention in a preferred form, we are aware that modifications can be made therein without departing from the spirit of the invention the scope of which is to be determined by the appended claims.

We claim:

1. A valve of the class described comprising a duct having an open discharge end with an internal surface defining a valve seat, a valve disc adapted to be pivoted on a transverse axis to cooperate with seat to open and close the discharge end of said duct, a yoke partially embracing said duct and having a centrally located stem extending into said discharge end and rigidly connected to the valve disc for supporting and pivoting said disc, oppositely projecting aligned bosses on the exterior of said duct, aligned apertures in the opposite sides of said yoke, and removable bushings extending through said apertures and embracing said bosses whereby said yoke is mounted for pivotal movement on said bosses.

2. A valve according to claim 1 wherein spring means engages said bushings to removably hold the same in position.

3. A valve according to claim 1 in which the valve disc has a groove around its edge, and an O-ring is seated in said groove to provide a positive seal between the disc and internal surface of said duct.

4. A valve according to claim 1 in which the pivotal axis of the disc extends through its center thereby dividing the disc into symmetrical halves having equal areas in contact with the fluid flowing through the duct, and the pivotal axis of the yoke is collinear with the pivotal axis of said disc thereby providing a balanced valve.

References Cited in the file of this patent

UNITED STATES PATENTS

| | | |
|---|---|---|
| 926,905 | Southerland | July 6, 1909 |
| 1,246,033 | Adams | Nov. 13, 1917 |
| 1,765,106 | Slaten | June 17, 1930 |
| 2,048,855 | Ewald | July 28, 1936 |
| 2,679,859 | Kummer | June 1, 1954 |
| 2,804,880 | Rasmusson | Sept. 3, 1957 |